United States Patent [19]
Woods

[11] Patent Number: 6,087,936
[45] Date of Patent: Jul. 11, 2000

[54] VIBRATION SENSOR

[76] Inventor: Randall Woods, 230 Longbranch East, Prescott, Ariz. 86303

[21] Appl. No.: 09/222,492

[22] Filed: Dec. 29, 1998

[51] Int. Cl.[7] .................................................. G08B 13/00
[52] U.S. Cl. ......................... 340/566; 340/429; 340/689; 200/61.54 R
[58] Field of Search .................................... 340/429, 540, 340/545.1, 545.2, 545.5, 546, 547, 601, 683, 565, 571, 686.1, 689; 200/61.45 R, 61.45 M, 61.62, 277; 335/205, 207

[56] References Cited

U.S. PATENT DOCUMENTS

| | | | |
|---|---|---|---|
| 1,051,962 | 2/1913 | Lundquist . | |
| 1,192,893 | 8/1916 | Harvey . | |
| 1,868,923 | 7/1932 | Semon . | |
| 3,516,036 | 6/1970 | Lea . | |
| 3,520,200 | 7/1970 | Rodgers | 200/61.54 R |
| 3,535,664 | 10/1970 | Staar . | |
| 3,630,168 | 12/1971 | Fladlay | 116/74 |
| 3,650,347 | 3/1972 | Campos | 340/429 |
| 3,763,484 | 10/1973 | Byers | 340/669 |
| 3,816,680 | 6/1974 | Suzuki et al. | 200/61.51 |
| 3,842,377 | 10/1974 | Barndt | 335/207 |
| 4,042,796 | 8/1977 | Zink | 200/61.45 R |
| 4,057,773 | 11/1977 | Cohen | 340/547 |
| 4,062,314 | 12/1977 | Allen et al. | 116/85 |
| 4,117,431 | 9/1978 | Eicher | 335/207 |
| 4,168,410 | 9/1979 | Norris | 200/61.45 R |
| 4,196,429 | 4/1980 | Davis | 340/566 |
| 4,210,888 | 7/1980 | Holce | 335/207 |
| 4,275,391 | 6/1981 | Okamura | 340/571 |
| 4,293,860 | 10/1981 | Iwata | 340/429 |
| 4,326,196 | 4/1982 | Plevy | 340/545.5 |
| 4,336,518 | 6/1982 | Holce et al. | 335/205 |
| 4,450,326 | 5/1984 | Ledger | 340/429 |
| 4,456,897 | 6/1984 | Holce et al. | 335/205 |
| 4,553,137 | 11/1985 | Holt | 340/546 |
| 4,567,846 | 2/1986 | Kurtz | 116/86 |
| 4,628,160 | 12/1986 | Canevari | 200/61.45 R |
| 4,656,458 | 4/1987 | Iwata | 340/669 |
| 4,688,025 | 8/1987 | Frank | 340/571 |
| 4,733,324 | 3/1988 | George | 335/207 |
| 4,788,517 | 11/1988 | Meister | 335/205 |
| 4,837,539 | 6/1989 | Baker | 335/207 |
| 4,884,067 | 11/1989 | Nordholm et al. | 340/689 |
| 4,982,058 | 1/1991 | Schroeder et al. | 200/61.62 |
| 5,153,566 | 10/1992 | Yun | 340/689 |
| 5,192,839 | 3/1993 | Imade et al. | 200/61.45 R |
| 5,248,861 | 9/1993 | Kato et al. | 20/61.45 R |
| 5,248,959 | 9/1993 | Chern | 340/601 |
| 5,332,992 | 7/1994 | Woods | 340/547 |
| 5,530,428 | 6/1996 | Woods | 340/547 |
| 5,673,021 | 9/1997 | Woods | 340/547 |

Primary Examiner—Daniel J. Wu
Assistant Examiner—Van T. Trieu
Attorney, Agent, or Firm—Hovey, Williams, Timmons & Collins

[57] ABSTRACT

A vibration sensor (10) that more effectively distinguishes between various causes of vibrations is disclosed. The vibration sensor includes a housing (18), a plurality of spaced contacts (22–34) positioned above the floor (44) of the housing, a central electrode (36) positioned within the housing, and an electrically-conductive ball (38) configured for movement within the housing. The contacts are interconnected by a plurality of electrically-conductive elements (50–62) such as resistors and are configured for connecting to a first terminal (12) of an alarm system (16). The central electrode is spaced from the contacts and is configured for connecting to a second terminal (14) of the alarm system. The ball is configured for simultaneously contacting at least one of the contacts and the central electrode so that it provides an electrical path between the first and second terminals to allow the transfer of an electrical signal therebetween. When the sensor is vibrated, the ball moves within the chamber over the spaced contacts so that it touches different ones of the contacts while remaining in contact with the central electrode. This changes the electrical characteristics of the signal passing through the first and second terminals. The alarm system monitors these changes in the signal to determine characteristics of the sensor. These characteristics are then analyzed to determine the magnitude, duration and/or other characteristic of the vibration to distinguish between various causes of the vibration.

17 Claims, 2 Drawing Sheets

VIBRATION SENSOR

BACKGROUND OF THE INVENTION

1. Field of the Invention

The present invention relates to vibration or shock sensors. More particularly, the invention relates to a vibration sensor that more effectively measures certain characteristics of vibrations and shocks to determine the cause thereof.

2. Description of the Prior Art

Vibration or shock sensors are commonly used in alarm systems to activate an alarm whenever the devices to which they are attached are touched, moved, or otherwise vibrated. For example, vibration sensors are commonly placed in windows of buildings to sense glass breakage and in car alarm systems to detect vehicle tampering. Additionally, the UL now requires high security safe and vault alarm systems to include vibration sensors.

Prior art vibrations sensors typically utilize ball or reed-type switches that open or close a contact when they are vibrated or moved. Unfortunately, these types of sensors often cause false alarms because they cannot distinguish between vibrations that occur due to normal causes and those that occur due to attempted unauthorized entry. For example, when placed in windows or doors, prior art sensors will often trigger an alarm when someone merely knocks on the window or door or when the window or door is vibrated due to thunder or wind as well as when someone attempts to illicitly gain entry through the window of door. This is because prior art vibration sensors only sense vibrations by detecting the opening and/or closing of a contact, which will occur regardless of the magnitude and/or duration of the vibrations.

There is therefore a need for an improved vibration sensor that more effectively distinguishes between various causes of vibrations.

OBJECTS AND SUMMARY OF THE INVENTION

The present invention solves the above-described problems and provides a distinct advance in the art of vibration sensors. More particularly, the invention provides a ball-type vibration sensor that more effectively distinguishes between various causes of vibrations.

The vibration sensor of the present invention achieves the foregoing by sensing not only the opening and/or closing of a contact by a ball in a ball switch, but also other characteristics such as the position, velocity and trajectory of the ball and the time that it takes the ball to return to its equilibrium position. This enables the sensor to determine the magnitude, duration and/or other characteristic of vibrations to distinguish between various causes of the vibrations, thus reducing false alarms and increasing the effectiveness and utility of the sensor.

One embodiment of the vibration sensor broadly includes a housing, a plurality of spaced contacts positioned above the floor of the housing, a central electrode positioned within the housing, and an electrically-conductive ball configured for movement within the housing. The contacts are interconnected by a plurality of electrically-conductive elements such as resistors and are configured for connecting to a first terminal of an alarm system. The central electrode is spaced from the contacts and is configured for connecting to a second terminal of the alarm system. The ball is configured for simultaneously contacting the central electrode and at least one of the contacts so that it provides an electrical path therebetween for the transmission of an electrical signal.

The ball is biased to an equilibrium position in the housing whenever the device to which the sensor is attached is not being vibrated. When the senor is vibrated, the ball moves over the spaced contacts and about the central electrode so that it touches different ones of the contacts while remaining in contact with the central electrode. As the ball moves, the electrical characteristics of the signal passing through the first and second terminals changes. The changes in the signal are affected by characteristics of the ball movement such as the position, velocity, and trajectory of the ball as well as the time that it takes the ball to return to its equilibrium position. These signal changes are analyzed by the alarm system or other controller to determine the magnitude, duration and/or other characteristic of the vibration to distinguish between various causes of the vibrations.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
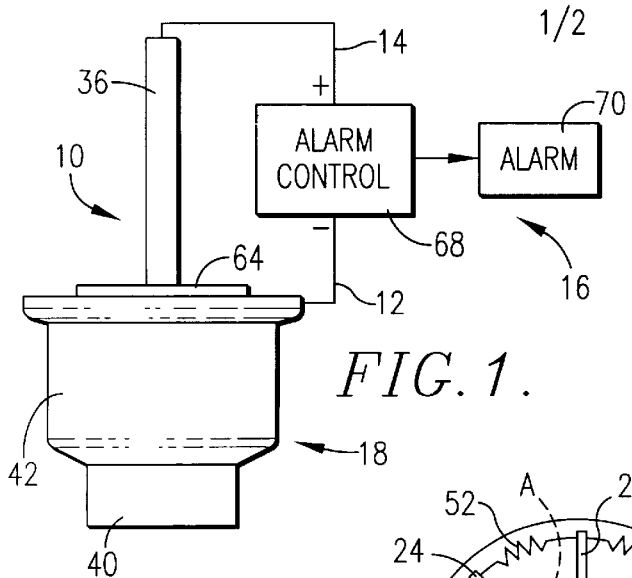
FIG. 1 is a schematic view of a sensor constructed in accordance with a preferred embodiment of the present invention and shown connected to an alarm system.

Turning now to the drawing figures, and particularly FIGS. 1–4, a vibration sensor 10 constructed in accordance with a preferred embodiment of the invention is illustrated. The sensor is configured for coupling with a pair of first and second terminals 12,14 of an alarm system 16 and broadly includes a housing 18, a plurality of spaced contacts 20,22, 24,26,28,30,32,34 positioned above the floor of the housing, a central electrode 36 positioned within the housing, an electrically-conductive ball 38 configured for movement within the housing, and a magnet 40 or other mechanism for biasing the ball to an equilibrium position within the housing.

Figure 5:
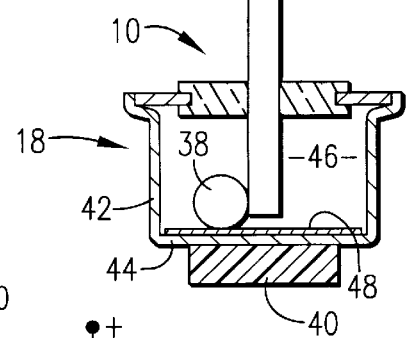
FIG. 5 is a vertical cross-sectional view of a sensor constructed in accordance with another preferred embodiment of the present invention.
Figure 2:
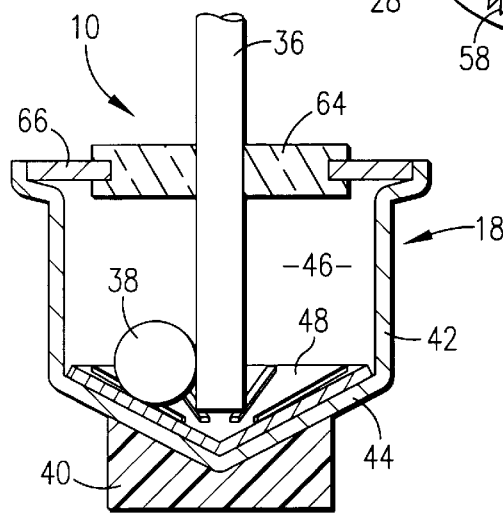
FIG. 2 is a partial vertical cross-sectional view of the sensor.

In more detail, the housing 18 is generally cup-shaped and includes a cylindrical sidewall 42 and a floor 44 defining a hollow interior chamber 46 therebetween. As illustrated in FIG. 2, the floor is preferably downwardly sloped toward the center of the housing, but may also be flat as illustrated in FIG. 5. The housing may be formed of metal, plastic or any other suitable material but is preferably non-magnetic.

Figure 3:
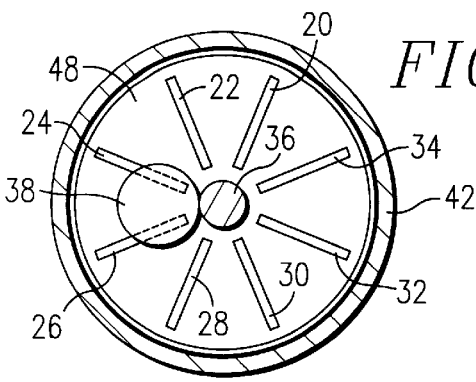
FIG. 3 is a horizontal cross-sectional view of the sensor illustrated in FIG. 2.

The contacts 20–34 are preferably elongated strips of conductive material that are printed on a circular circuit board 48 that rests on top of the housing floor 44. The contacts extend radially out from the center of the circuit board and are angularly spaced in a spoke configuration and are raised above the upper surface of the circuit board. Adjacent contacts are spaced sufficiently close to ensure that the ball 38 is always touching at least one of the contacts as it moves across the floor of the housing as best illustrated in FIG. 3.

Figure 4:
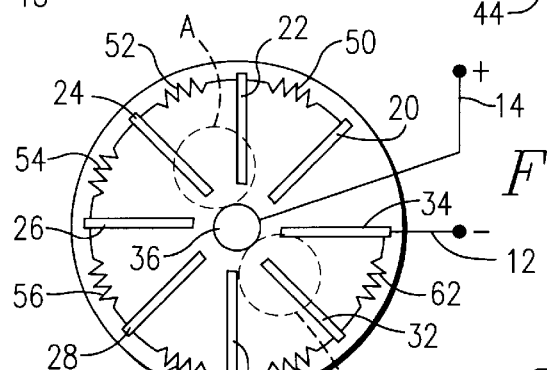
FIG. 4 is an electrical schematic illustrating the operating characteristics of the sensor of FIGS. 2 and 3.

As schematically illustrated in FIG. 4, the contacts 20–34 are interconnected by a plurality of electrically-conductive elements 50,52,54,56,58,60,62 such as resistors so that they form a single, series-connected electrical path. The resistors preferably all have the same resistive value of approximately 20–30 ohms. The end contact 34 is configured for connecting to the first terminal 12 of the alarm system 16. This may be accomplished by electrically connecting the contact to the housing 18 and in turn connecting the housing to the alarm system as illustrated in FIG. 1 or by connecting the contact directly to the alarm system with a wire or other conductor.

The central electrode 36 is preferably an elongated pin or rod formed of electrically conductive metal. The electrode is positioned vertically within the housing 18 near the center of the chamber 46. The lower edge of the electrode is spaced from the upper surface of the circuit board 48 and the contacts 20–34 and the upper edge extends out the open-end of the housing so that it can be readily connected to the second terminal 14 of the alarm system. The electrode is supported in the housing and above the circuit board by a ring-shaped insulator 64 that is held in the open-end of the housing by an annular eyelet 66 or washer.

The ball 38 is preferably formed of electrically conductive ferromagnetic material and is sized so that it freely moves along the upper surface of the circuit board 48 and about the central electrode 36. The ball is configured for simultaneously contacting at least one of the contacts 20–34 and the central electrode so that it provides an electrical path between the first and second terminals 12,14 to allow the transfer of an electrical signal therebetween.

The magnet 40 is preferably positioned below the housing floor 44 and is oriented so that it biases the ball 38 to an equilibrium position. For example, the magnet may be oriented to bias the ball to the position indicated by the letter "A" in FIG. 4. The magnet also attracts the ball downward and toward the center of the housing so that the ball firmly contacts both the center electrode 36 and the contacts 20–34 to improve the conductivity therebetween. The magnet may be eliminated by sloping the floor in such a manner so that the ball is biased by gravity to its equilibrium position. The exact equilibrium position of the ball is not important; however, it is important that the ball always return to this position whenever the device to which the sensor is attached is not being vibrated.

Although not required, the ball 38 may be formed of permanent magnetic materials to increase the magnetic attraction between the ball and the magnet 40. This improves the contact rating of the ball and permits the use of a smaller biasing magnet 40.

As illustrated in FIG. 1, the alarm system 16 preferably includes a controller 68 and an alarm device 70 such as a bell or horn. The controller is operable for transmitting an electrical signal through the first and second terminals 12,14 and for analyzing the characteristics of the signal such as the signal's voltage and/or current level.

In use, the sensor 10 is placed in a window, door, or any other object that is to be monitored for vibrations or shocks. The sensor is then electrically connected to the alarm system 16 by connecting the end contact 34 to the first terminal 12 and the central electrode 36 to the second terminal 14 in a conventional manner. Because the electrically conductive ball 38 is always in contact with at least one of the contacts and the central electrode, the contacts, central electrode, ball, and first and second terminals form a closed circuit that is connected to the alarm system.

The controller 68 transmits an electrical signal through the circuit and monitors vibrations and shocks that move the ball 38 in the housing 18 by monitoring the electrical characteristics of the signal. When the sensor 10 is in its normal state, i.e., not being vibrated or moved, the ball is in its equilibrium position indicated by the letter "A" in FIG. 4. While the ball is in this position, the signal must pass through the resistors 54,56,58,60,62, so that the circuit has a total resistance of 100 ohms if each of the resistors has a value of 20 ohms.

If the sensor 10 is vibrated sufficiently to overcome the bias of the magnet 40 or the sloped floor 44, the ball 38 moves from its equilibrium position across the floor about the central electrode 36. As the ball moves, it passes over the spaced contacts 20–34 so that it touches different ones of the contacts while remaining in contact with the central electrode. This changes the total resistance of the circuit and therefore changes the electrical characteristics of the signal passing through the first and second terminals 12,14. For example, if the ball is moved from position "A" to position "B" in FIG. 4, the signal passes only through the single resistor 62, so the circuit resistance drops from 100 ohms to 20 ohms.

The changes in the signal are determined by characteristics of the ball movement such as the position, velocity, and trajectory of the ball as well as the time that it takes the ball to return to its equilibrium position. The controller analyzes these signal changes to determine the magnitude, duration and/or other characteristic of the vibration to distinguish between various causes of the vibrations, thus reducing false alarms and increasing the effectiveness and utility of the sensor.

For example, if the sensor 10 is placed in a window or other glass, a minor vibration such as may occur due to knocking on the window, thunder, wind, or other natural cause may only cause the ball 38 to move slowly and a short distance from its equilibrium position and to quickly return to this position. In contrast, a more severe vibration such as may occur due to glass breakage and/or unauthorized entry into a building or vehicle will likely cause the ball to move rapidly and far from its equilibrium position and to never return to this position. The controller 68 can be programmed to distinguish between these types of vibrations and to trigger the alarm only upon detection of certain types of vibrations.

Figure 6:
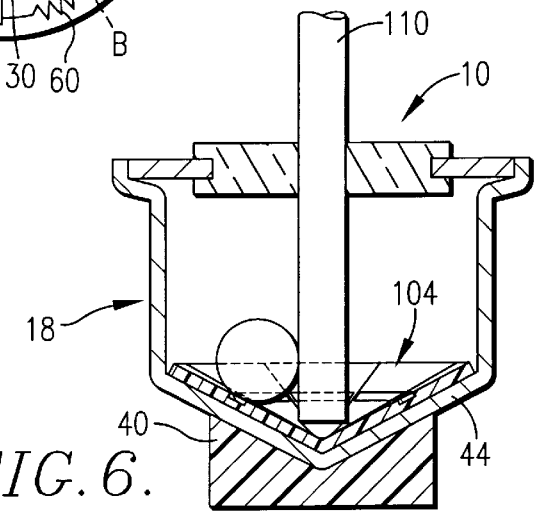
FIG. 6 is a partial vertical cross-sectional view of a sensor constructed in accordance with another preferred embodiment of the present invention.
Figure 7:
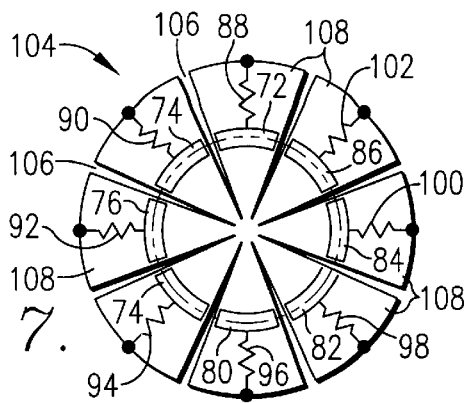
FIG. 7 is a top view of a circuit board that is inserted in the sensor of FIG. 6.

FIGS. 6 and 7 illustrate another embodiment of the invention that is similar to the embodiment shown in FIGS.

1–4, except that it includes flush, generally rectangular-shaped contacts 72,74,76,78,80,82,84,86 that are not series connected. Rather, the contacts are each connected to a resistor 88,90,92,94,96,98,100,102 that is in turn connected to the second terminal 14 of the alarm system 16. In this embodiment, each resistor has a different resistive value so that the controller can determine which contact the ball is touching.

FIGS. 6 and 7 also illustrate a method of constructing the circuit board 104 so that it can be formed flat but still conform to the sloped floor of the housing 18. Particularly, as illustrated in FIG. 7, the circuit board is formed by cutting a series of narrow wedges 106 from a circular circuit board to create a series of circumferentially-spaced and centrally connected pie-shaped wedges 108. The circuit board is then inserted into the housing and pushed down against the floor 44 by a central electrode 110 having a rounded bottom edge so that the circuit board conforms to the sloped floor.

Figure 8:
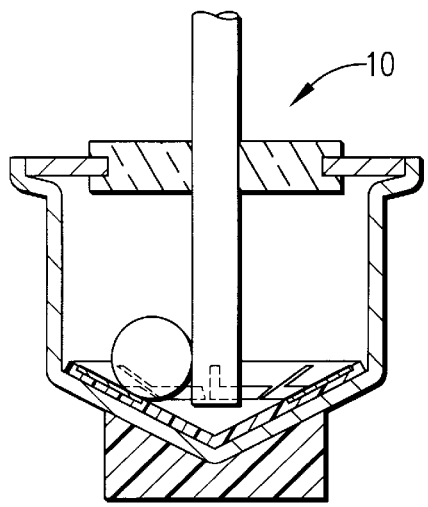
FIG. 8 is a partial vertical cross-sectional view of a sensor constructed in accordance with another preferred embodiment of the present invention.
Figure 9:
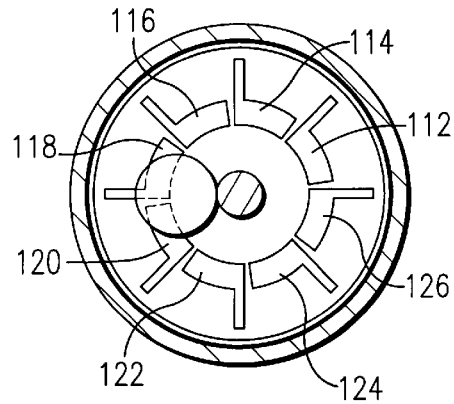
FIG. 9 is a horizontal cross-sectional view of the sensor of FIG. 8.
Figure 10:
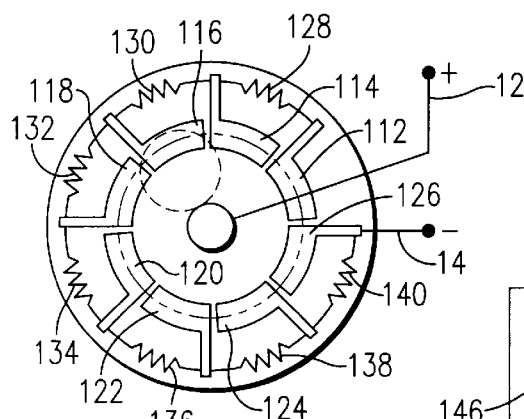
FIG. 10 is an electrical schematic illustrating the operating characteristics of the sensor of FIGS. 8 and 9.

FIGS. 8–10 illustrate another embodiment of the sensor 10 that includes contacts 112,114,116,118,120,122,124,126 that are generally rectangular in shape and flush-mounted as with the contacts 72–86 of the embodiment illustrated in FIGS. 6 and 7. However, the contacts are series connected by a series of conductive elements such as resistors 128, 130,132,134,136,138,140 similar to the embodiment illustrated in FIGS. 1–5.

Figure 13:
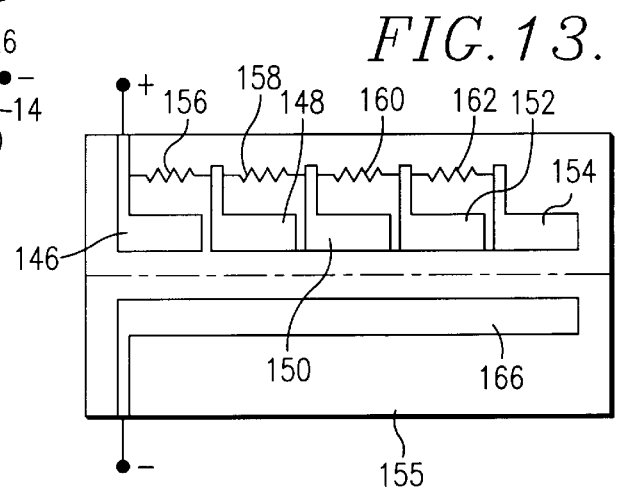
FIG. 13 is an electrical schematic illustrating the operating characteristics of the sensor of FIGS. 11 and 12.
Figure 11:
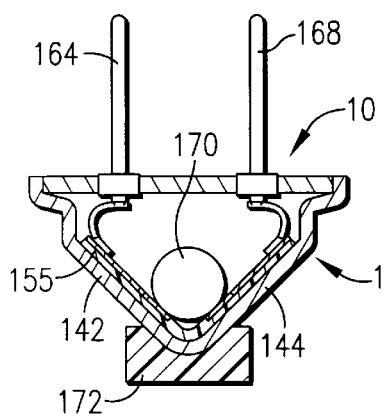
FIG. 11 is a vertical side cross-sectional view of a sensor constructed in accordance with another preferred embodiment of the present invention.
Figure 12:
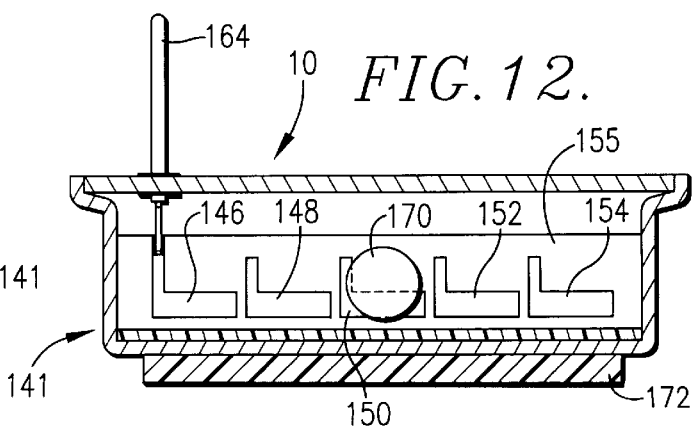
FIG. 12 is a vertical front cross-sectional view of the sensor illustrated in FIG. 11.

FIGS. 11–13 illustrate yet another embodiment of the sensor that includes a housing 141 formed from a pair of intersecting, planar sidewalls 142,144 that together form an elongated v-shaped channel. A v-shaped circuit board 155 rests on top of the housing, and contacts 146, 148, 150, 152, 154 are formed on the top surface of the circuit board and are interconnected by resistors 156,158,160,162. The end contact 156 is connected to an upstanding terminal 164. An elongated electrode 166 is formed on the surface of the opposite sidewall 144 and is connected to an upstanding terminal 168. The terminals 164 and 168 are then connected to the terminals 12,14 of the alarm system as described above. A ball 170 is positioned in the housing so that it moves linearly across the floor of the channel and simultaneously contacts the electrode and at least one of the contacts. The ball is biased to an equilibrium position by a magnet 172 so that the sensor operates in a similar manner as the sensor illustrated in FIGS. 2–5.

Although the invention has been described with reference to the preferred embodiments illustrated in the attached drawing figures, it is noted that equivalents may be employed and substitutions made herein without departing from the scope of the invention as recited in the claims. For example, those skilled in the art will appreciate that the resistors may be replaced with other conductive elements such as inductors, capacitors, etc., that would alter the characteristics of the electrical signal passing between the first and second terminals when the ball moves across the contacts. Also, although the sensor has been described as being particularly useful in alarm systems, it can be used in any application where it is desired to monitor vibrations such as in seismic equipment or in packaging.

Having thus described the preferred embodiment of the invention, what is claimed as new and desired to be protected by letters patent includes the following.

What is claimed is:

1. A sensor for connecting to a vibration monitoring system comprising:
    a housing having a floor sloped downward toward its center and a sidewall defining a chamber therebetween;
    a plurality of spaced, electrically-conductive contacts positioned above the floor, one of the contacts being configured for connecting to a first terminal of the vibration monitoring system;
    a plurality of spaced electrically-conductive elements interconnecting the contacts;
    an electrode positioned near the center of the chamber and spaced from the contacts, the electrode being configured for connecting to a second terminal of the vibration monitoring system; and
    an electrically-conductive ball positioned within the chamber for movement therein and configured for simultaneously contacting at least one of the contacts and the electrode so that the ball connects the first and second terminals to allow the transmission of an electrical signal therebetween, whereby as the ball moves within the chamber it contacts different ones of the contacts to change the electrical characteristics of the signal.

2. The sensor as set forth in claim 1, wherein the electrically-conductive elements include resistors.

3. The sensor as set forth in claim 2, wherein the contacts and the resistors are printed on a circuit board positioned on the floor of the housing.

4. The sensor as set forth in claim 1, further including a magnet positioned below the housing for biasing the ball into simultaneous contact with the electrode and at least one of the contacts.

5. The sensor as set forth in claim 3, wherein the contacts are raised relative to the upper surface of the circuit board.

6. The sensor as set forth in claim 3, wherein the contacts are flush relative to the upper surface of the circuit board.

7. The sensor as set forth in claim 2, wherein the resistors each has a resistance of approximately 20–30 ohms.

8. A sensor for connecting to a vibration monitoring system comprising:
    a housing having a floor sloped downward toward its center and a sidewall defining a chamber therebetween;
    a plurality of spaced, electrically-conductive contacts positioned above the floor;
    a plurality of electrically-conductive elements each connected to one of the contacts and configured for connecting to a first terminal of the vibration monitoring system, each of the electrically conductive elements having a different level of conductivity;
    an electrode positioned near the center of the chamber and spaced from the contacts, the electrode being configured for connecting to a second terminal of the vibration monitoring system; and
    an electrically-conductive ball positioned within the chamber for movement therein and configured for simultaneously contacting at least one of the contacts and the electrode so that the ball connects the first and second terminals to allow the transmission of an electrical signal therebetween, whereby as the ball moves within the chamber it contacts different ones of the contacts to change the electrical characteristics of the signal.

9. The sensor as set forth in claim 8, wherein the electrically-conductive elements include resistors.

10. The sensor as set forth in claim 9, wherein the contacts and the resistors are printed on a circuit board positioned on the floor of the housing.

11. The sensor as set forth in claim 8, further including a magnet positioned below the housing for biasing the ball into simultaneous contact with the electrode and at least one of the contacts.

12. The sensor as set forth in claim 10, wherein the contacts are raised relative to the upper surface of the circuit board.

13. The sensor as set forth in claim 10 wherein the contacts are flush relative to the upper surface of the circuit board.

14. An alarm system comprising:

a sensor including a housing having a floor sloped downward toward its center and a sidewall defining a chamber therebetween;

a plurality of spaced, electrically-conductive contacts positioned above the floor, a plurality of spaced electrically-conductive elements interconnecting the contacts, an electrode positioned near the center of the chamber and spaced from the contacts, and an electrically-conductive ball positioned within the chamber for movement therein and configured for simultaneously contacting at least one of the contacts and the electrode so that the ball connects at least one of the contacts and the electrode to allow the transfer of an electrical signal therebetween, whereby when the sensor is vibrated, the ball moves within the chamber and contacts different ones of the contacts; and a controller coupled with one of the contacts and the electrode for transmitting an electrical signal therebetween and for analyzing the electrical characteristics of the signal for determining the cause of the vibration.

15. The alarm system as set forth in claim 14, wherein the electrically conductive elements include resistors.

16. The alarm system as set forth in claim 14, further including a magnet positioned below the housing for biasing the ball into simultaneous contact with the electrode and at least one of the contacts.

17. A sensor for connecting to a vibration monitoring system comprising:

a housing having a floor and a sidewall defining a chamber therebetween;

a plurality of spaced, electrically-conductive contacts positioned above the floor and electrically connected to one another in series, the contacts each having a resistive value, one of the contacts being configured for connecting to a first terminal of the vibration monitoring system;

an electrode positioned within the chamber and spaced from the contacts, the electrode being configured for connecting to a second terminal of the vibration monitoring system; and an electrically-conductive ball positioned within the chamber for movement therein and configured for simultaneously contacting at least one of the contacts and the electrode so that the ball, the contacts, and the electrode form a circuit allowing transmission of an electrical signal between the first and second terminals, whereby as the ball moves within the chamber, it touches different ones of the contacts and therefore changes a total resistance of the circuit formed by the ball, the contacts, and the electrode to change a magnitude of the electrical signal.

* * * * *